No. 609,905. Patented Aug. 30, 1898.
J. PORTEOUS & R. W. COLE.
SEED DRILL.
(Application filed Feb. 7, 1898.)
(No Model.) 2 Sheets—Sheet 1.
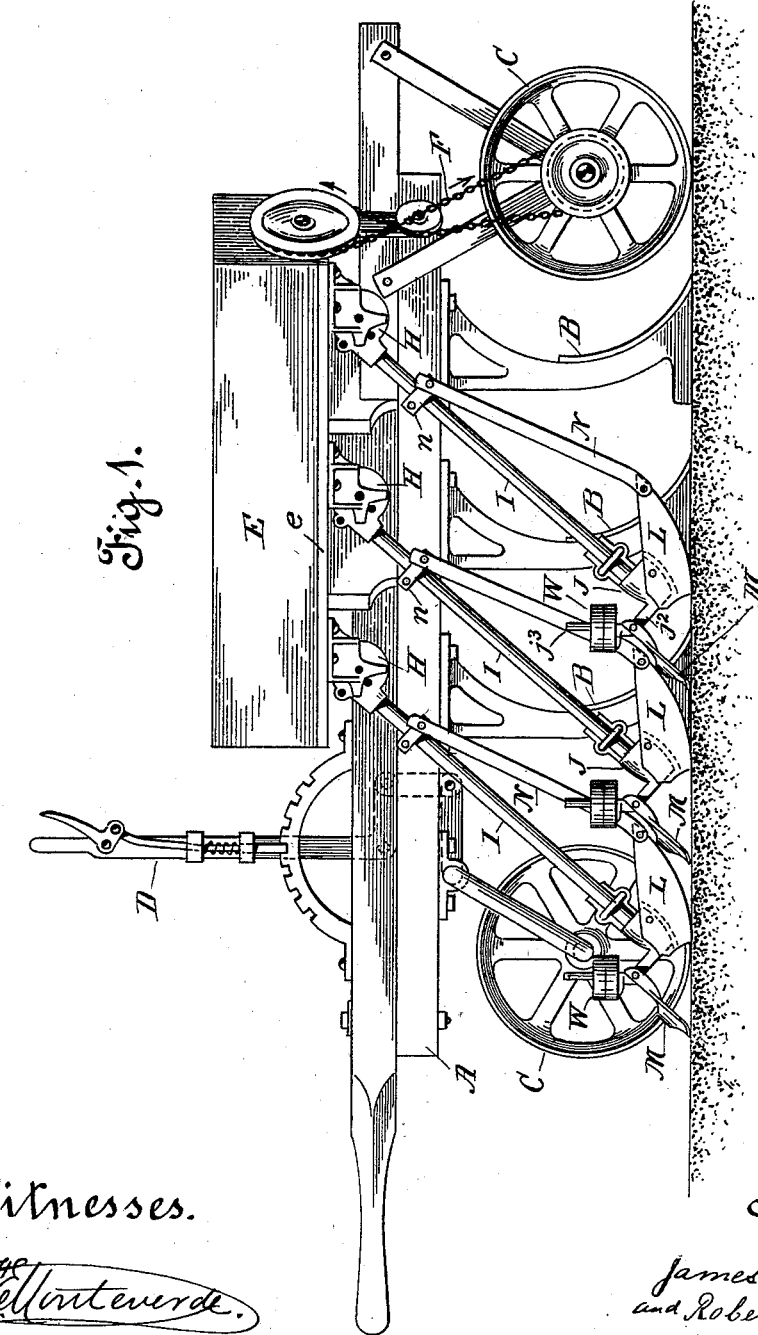

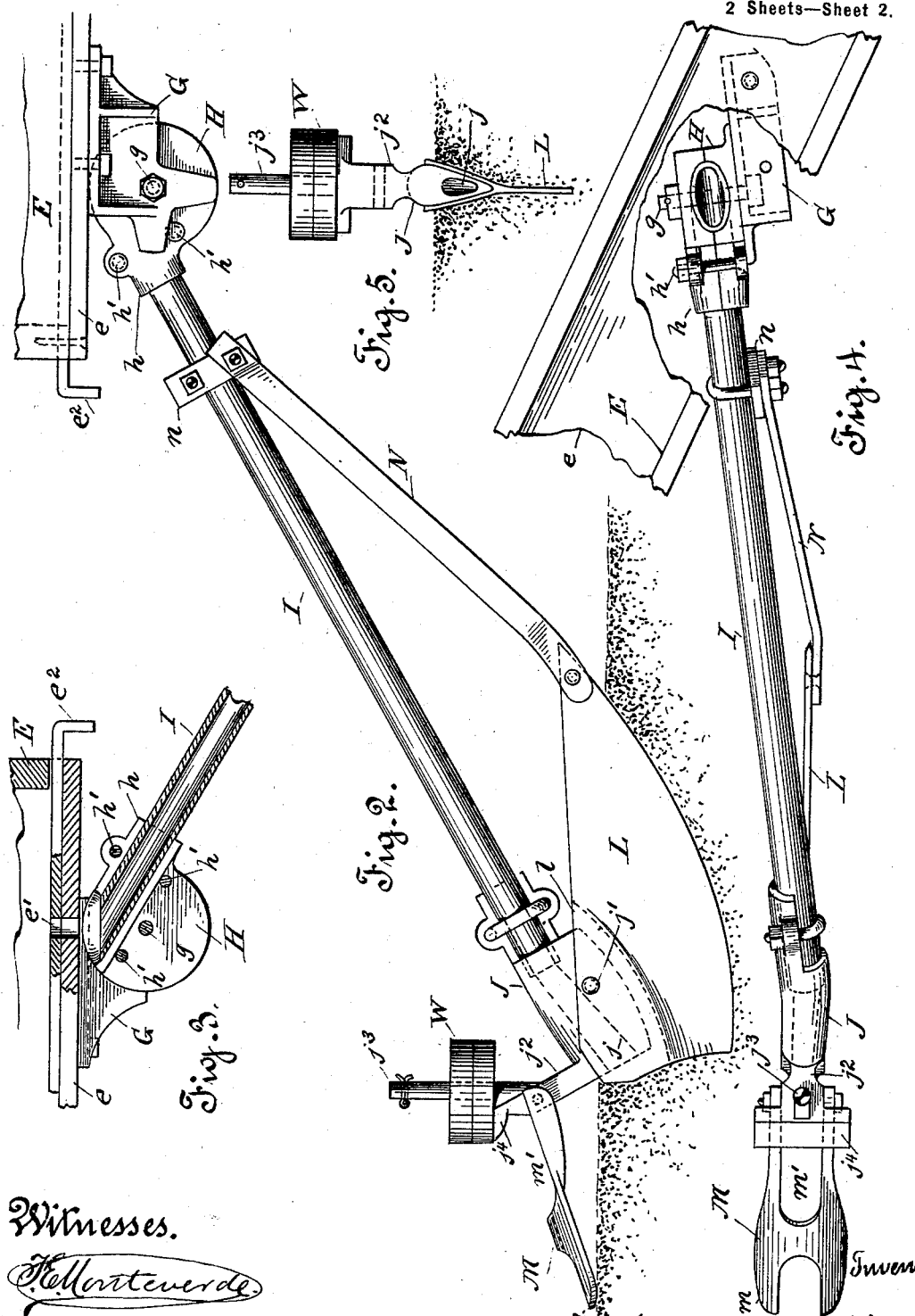

UNITED STATES PATENT OFFICE.

JAMES PORTEOUS AND ROBERT WILSON COLE, OF FRESNO, CALIFORNIA; SAID COLE ASSIGNOR TO SAID PORTEOUS.

SEED-DRILL.

SPECIFICATION forming part of Letters Patent No. 609,905, dated August 30, 1898.

Application filed February 7, 1898. Serial No. 669,314. (No model.)

*To all whom it may concern:*

Be it known that we, JAMES PORTEOUS and ROBERT WILSON COLE, citizens of the United States, residing at Fresno, in the county of Fresno and State of California, have invented certain new and useful Improvements in Seed-Drills; and we do hereby declare the following to be a full, clear, and exact description of the same.

Our invention relates to seed-drills; and it consists in the novel arrangement and construction of the pipe conveyers, the drill attachments below and supply-hoppers above, and the several connections of these parts, as we shall hereinafter fully describe.

The main object of our invention is to simplify the construction of seed-drills and to render them easier of draft and generally more efficient in operation.

Our improvements, though applicable to implements having the sole function of dropping seed in drills or to devices combining other functions or operations therewith, are best illustrated in a machine which may be called a "combined plow and seeder," though we would have it understood that neither the plow-bottoms nor the operation of plowing have anything to do with our invention other than to illustrate them. For this purpose we deem it best to refer to the combined plow and seeder patented by James Porteous, one of the present applicants, September 22, 1896, No. 568,100, this reference being with a view to make our present improvements clearer. For like reason we have in the accompanying drawings, in Figure 1, shown our improvements as applied to a combined machine.

In the drawings, Fig. 1 is a side elevation of the machine with our seed-drill improvements applied. Fig. 2 is a side elevation of one of the drills. Fig. 3 is a sectional detail showing the communication of the upper end of the pipe conveyer with the seedbox. Fig. 4 is a plan of one of the drills. Fig. 5 is a rear view of the drill attachments below, the coverer-plates M being omitted.

A is a frame, which may be supposed to be of any of the usual forms, adapted to carry the series of plow-bottoms B, which are in a line inclined to the line of draft or travel of the frame, as is customary. The frame is supported on wheels C, suitably arranged, and it is adapted to be adjusted by means of the lever D and suitable connections, as indicated.

Supported on frame A is the seedbox E, which may be supposed to be provided with suitable discharging mechanism, unnecessary herein to show, but which may be, say, for example, what is known as a "force-feed," operated by suitable means, such as the endless chain F at the front and the pulleys necessary to transmit motion from the front wheel, as we have shown in Fig. 1. The seedbox is carried directly above that bar of the frame which is parallel with the line of plows and with the line of drills—say the hypotenuse of the usual right-angle-triangle frame. The only feature of novelty to be noted in connection with the seedbox is the unusual strength of its bottom, which we form of a heavy iron plate $e$, because, as we shall hereinafter point out, the pulling strain of the drills and their attached parts, such as their shoes or hoes, as the case may be, is primarily referable to and is resisted by this plate. To this bottom plate at proper intervals are bolted brackets consisting of castings G, to the side of each of which is pivotally connected by a bolt $g$ a hopper H, which lies directly under the discharge-opening $e'$ in the bottom plate and is adapted to receive the seed therefrom, the discharge of said seed being here shown as controlled by a perforated slide-plate $e^2$ in usual manner. This hopper is best made from a two-part casting, as shown, said casting being formed with a section constituting a clamping-socket $h$, held together by suitable bolts $h'$. In this socket-section is clamped the head end of the seed-conveyer I, which instead of being a flexible tube, as is the ordinary form of conveyer, is a rigid pipe—in practice a metallic one. The upper end of this pipe enters the clamp-socket $h$ and communicates directly with the hopper H, being beveled to present a perfectly unobstructed entrance to the seed from the hopper. The rigid or non-flexible conveyer-pipe I thence extends downwardly and enters and is clamped in the drill-foot, consisting of a casting J, which has a hole $j$ through it whereby the seed from the conveyer will pass down through and be discharged. The pipe I and the drill-foot casting J are both bent laterally sufficiently to carry the attached parts in a line properly inclined to the line of travel of the machine—that is, parallel to the line of plow-bottoms, as is necessary.

Though the ordinary shoes or hoes may be used, we have here shown shoes L of the general type. Each of these is formed with a recess $l$ in the rear upper portion, into which the base of the foot-casting J is fitted, and is secured by a rivet at $j'$ loose enough to permit the required adjustment of the shoe, as we shall presently point out. The rear end of the recess $l$ is open to permit the seed from the discharge end of the foot-casting to reach the ground.

From the lower end of the foot-casting extends an arm $j^2$, from which a pin $j^3$ rises, which said pin is adapted to receive and carry removable weights, such as W, adapted to press and hold the shoes into the ground with the required pressure, according to the nature of the ground. To each arm $j^2$ is pivoted a coverer-plate M, having a forked extremity $m$ and adapted by pressure upon the walls of the cut or furrow made by the shoe to break down said walls and thus to cover the seed in said cut or furrow. The coverer-plates are open above, as shown at $m'$, whereby inspection of the seed discharge may be had at any time to see that the operation is proceeding satisfactorily.

The upper end of arm $j^2$ forms a stop or buffer at $j^4$ to prevent the coverer-plate when thrown upwardly by a clod or by the dropping of the shoe into a squirrel-hole from swinging over forwardly and not returning. It is thus permitted to rise sufficiently to prevent its breaking under too great resistance; but at the same time it is stopped at such inclination that its return to working position is insured.

To the forward end of each shoe is connected a link N, which extends upwardly to a clamp $n$, fitted on the non-flexible conveyer-pipe I and adapted to be adjusted up or down thereon to regulate and control the necessary inclination of the shoe, according to the nature of the ground, said shoe turning slightly to the proper adjustment about the rivet $j'$.

The connection of the link with the shoe is made as flush as possible, whereby said link serves as a weed-guard in addition to its function as a brace and as an adjuster.

The pivotal connection of the hopper-casting H with the fixed bracket-casting G enables the whole drill mechanism to have the necessary up-and-down movement to adjust it to the requirements of uneven ground.

From the foregoing it will be seen that the non-flexible rigid conveyers I have in addition to their function as conveyers the further office of carrying and supporting the whole bottom attachments of the drill and serving as draw-bars therefor, thereby avoiding the necessity in whole or in part of braces and pull-rods, and all the necessary adjustments are provided for. This simplifies the construction and renders the machine less liable to choke up with weeds, &c., by reason of a multiplicity of parts, such as chains, flexible tubes, and draw-bars. It also condenses it, as it were, enabling the line of pulling strain to be carried farther into the body of the frame A, thereby permitting the carrying-wheels to be better arranged, as side tilting strain is obviated to a large extent. We are therefore able to locate the rear wheel over to one side, taking it out of the plow-furrow, this latter position being objectionable, but rendered necessary in cases where the weight is carried too far out on the drill side of the machine.

In our present construction the seed-passage through the conveyer and foot-casting is not exposed anywhere throughout its entire length, as is the case where the conveyer is a flexible tube and enters comparatively loosely the top of a hopper-like foot. In this last-named case the dirt from the plows in plowing uneven land enters the top of and chokes the foot; but in our machine the conveyer fits tightly in the foot-casting and no dirt can enter, and we can set the drills closer in to the line of the plows, and this closer position obviates the side tilting strain and side draft, as before mentioned.

Having thus described our invention, what we claim as new, and desire to secure by Letters Patent, is—

1. In a seed-drill, the combination of a seed-box, brackets bolted to the bottom of said box at intervals, hoppers pivoted to the side of said brackets, each hopper communicating with a discharge from the seedbox and consisting of a two-part casting, the upper portion of which forms the hopper and the lower portion a clamping-socket, conveyer-pipes having their upper ends secured in the clamping-sockets and communicating with the hoppers, and drill attachments carried by the lower ends of the conveyer-pipes and drawn thereby.

2. In a seed-drill, the combination of a rigid pipe conveyer, a shoe connected therewith, and a link connected with the forward end of the shoe and adjustably connected with the pipe conveyer above, whereby the inclination of the shoe can be adjusted.

3. In a seed-drill, the combination of a rigid pipe conveyer pivotally connected with a fixed part of the frame above, a hollow foot secured to the lower end of the pipe conveyer and communicating therewith, and a shoe having a recess into which the foot is fitted.

4. In a seed-drill, the combination of a rigid pipe conveyer pivotally connected with a fixed part of the frame above, a hollow foot secured to the lower end of the pipe conveyer and communicating therewith, and a shoe having a recess into which the foot is fitted pivotally, said shoe having a link connected with its forward end and adjustably connected at its upper end with the pipe conveyer.

5. In a seed-drill, the combination of a rigid pipe conveyer pivotally connected with a fixed part of the frame above, a foot-piece connected with its lower end, a shoe connected with said foot-piece, and a weight-receiver on said foot-piece, to regulate the pressure on the shoe.

6. In a seed-drill, the combination of a rigid pipe conveyer pivotally connected with a fixed part of the frame above, a foot-piece connected with the lower end of the pipe conveyer and having an arm with a pin adapted to receive weights, and a shoe connected with the foot-piece.

7. In a seed-drill having independent drills, the independent coverer-plates pivotally connected with the lower ends of the drills and having forked extremities to break down the walls of the cuts made by the drill attachments, whereby the seed is covered, and a fixed stop rising from the lower end of each drill to limit the upward swing of the coverer-plate and to insure its return.

In witness whereof we have hereunto set our hands.

JAMES PORTEOUS.
ROBERT WILSON COLE.

Witnesses:
W. T. PORTER,
W. J. KETTRELL.